INVENTOR
RALPH TAYNTON
BY Samuel [signature]
ATTORNEY

INVENTOR
RALPH TAYNTON

BY [signature]
ATTORNEY

PACKAGING OF ELECTRICAL EQUIPMENT

INVENTOR
RALPH TAYNTON
BY Samuel Cole
ATTORNEY

INVENTOR
RALPH TAYNTON
BY
ATTORNEY

INVENTOR
RALPH TAYNTON
BY Samuel Cole
ATTORNEY

United States Patent Office 3,434,014
Patented Mar. 18, 1969

3,434,014

PACKAGING OF ELECTRICAL EQUIPMENT

Ralph Taynton, North Palm Beach, Fla., assignor to Radio Corporation of America, a corporation of Delaware Filed June 13, 1967, Ser. No. 645,687
U.S. Cl. 317—99 24 Claims
Int. Cl. H02b *1/00, 1/08*

ABSTRACT OF THE DISCLOSURE

An arrangement for protecting and cooling electrical equipment and for distributing power and signals among different components of said equipment. Equipment may include a drum (employed for the storage of binary information) and circuits associated with the drum. Some of the circuits are mounted on circuit boards which form the doors of a housing for the drum and which both protect the drum from dirt and act as walls of passageways through which cooling air may be forced. Distribution of electrical currents is accomplished by means of a laminated structure including alternate conductor and insulator layers and a printed circuit board for connecting to the laminated structure, both secured to an end of the housing and both formed with an opening through which cooling air may enter the passageways.

*Summary of the invention*

The system of the invention includes a housing formed with an opening at one end thereof through which air is adapted to flow and including electrical circuits. A printed circuit board is located at said one end of said housing and is formed also with an opening in general alignment with that of the housing and which has spaced conductors on the surface thereof facing away from the housing. A laminated structure is secured between the printed board and the housing. This structure has the same general shape as and is in general alignment with the printed circuit board and it comprises conductor layers spaced from one another by insulator layers. The conductor layers are formed with tabs at an edge thereof which extend to and make electrical contact with respective ones of the spaced conductors on the printed circuit board. A power cable is connected to some of the spaced conductors. Distribution conductors, which may include printed conductors on the other surface of the printed circuit board, connect the first mentioned printed conductors to the electrical circuits.

*Detailed description*

Figure 1:
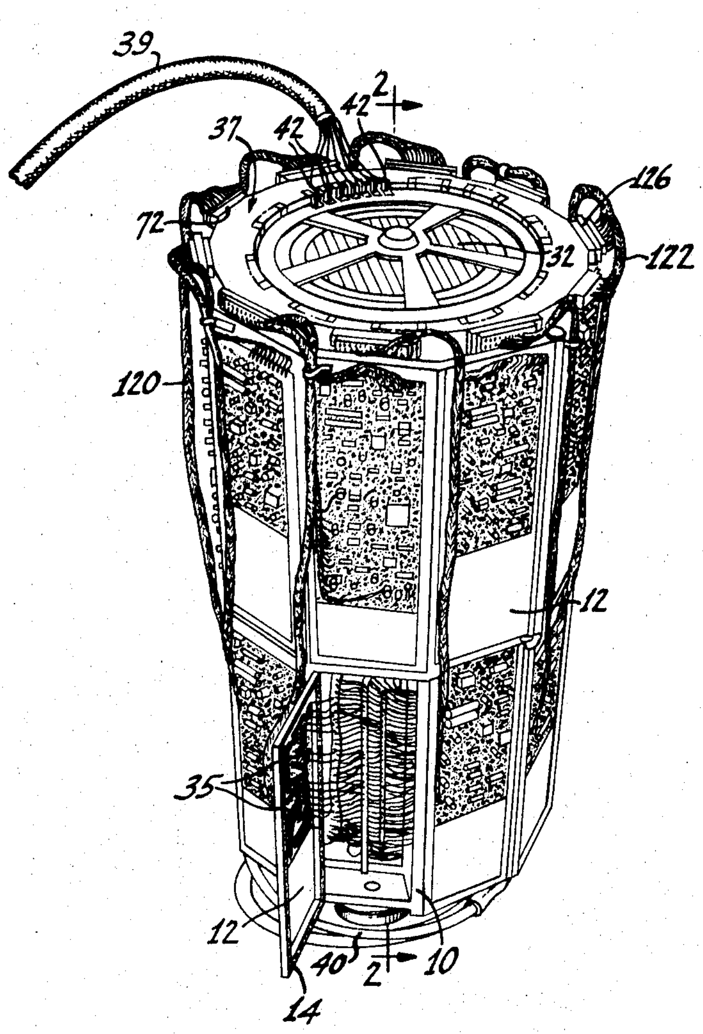
FIGURE 1 is a perspective view of a drum memory system employing the signal distribution and cooling arrangement of the present invention.
Figure 2:
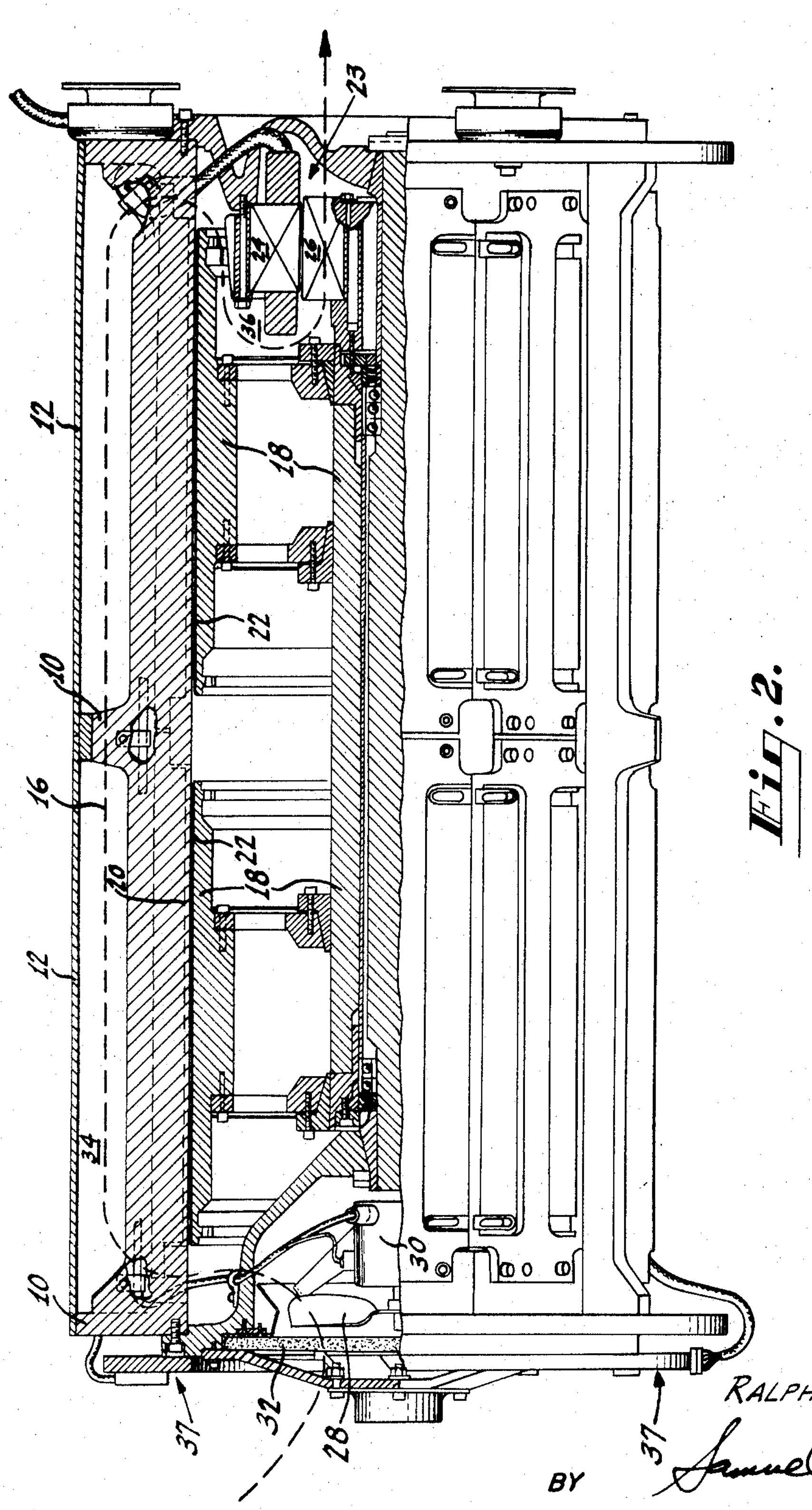
FIGURE 2 is a section taken along line 2—2 of FIGURE 1 (this figure shows the drum lying on its side with the feet on which the drum memory normally stands on the right and the top of the drum memory on the left)

The drum memory system shown in FIGURES 1 and 2 includes a metal framework, shown in part at 10, and doors 12 hinged to the framework. The hinged doors consist of metal framed circuit boards carrying the circuits, such as amplifiers, logic circuits and the like, which are necessary to the operation of the drum memory system. Each door is formed with gaskets 14 around its inner edge portions which, when the doors are closed, form an air seal. These doors 12 serve two functions. They protect the inner portion of the drum memory system from dirt and they also form walls of passageways through the structure for cooling air. One such passageway is indicated in FIGURE 2 by the dashed line 16.

The rotor of the drum memory of FIGURE 2 is shown at 18. The read/write heads, which are not visible in FIGURE 2, are mounted in the stator 20 immediately adjacent to the magnetic surface 22 of the rotor. The drive mechanism for the rotor of the drum is located at the base of the structure and consists of the motor 23 having a stator 24 which is fixed to the chassis and a rotor 26 which is fixed to the rotor of the drum. The cooling fan 28 is located at the opposite end of the drum housing from the drive motor 23. This fan is driven by another motor 30.

In operation, the cooling fan drives air through the opening in which the air filter 32 is located. This is at the upper end of the housing as viewed in FIGURE 1. Air passes into the drum housing and through the various passageways, which surround the drum rotor, one of which passageways is shown at 34 in FIGURE 2. One side of each such passageway is formed by the doors 12 which consist of circuit boards. Heat transfer occurs from the circuit elements mounted on the boards to the boards, by conduction. This heat is removed by forced connection—the flow of cooling air through the passageways. The conductors on the underside of the boards, some of which are shown in greatly exaggerated form at 35 in FIGURE 1 are also cooled in the same manner.

The cooling air, after leaving the passageways adjacent to the circuit boards, enters the region 36 (FIGURE 2) and passes through the drum drive motor 23, cooling the motor in the process. The hot air is forced out of the bottom of the structure as shown in FIGURE 2.

The distribution of power and of signals to the various circuit boards and other regions of the drum system is accomplished by means of the structure 37 at the top of the drum. This structure includes a ring-shaped printed circuit board and ring-shaped conductors, the details of which will be discussed shortly. Power is conducted to this structure by the cable 39, shown at the upper left in FIGURE 1. Its seven wires connect to the seven pins 42 at the top of the chassis. These pins are shown somewhat more clearly in the plan view of FIGURE 3 and one such pin 42 is shown in greatly enlarged view in FIGURE 4. In this last figure, one wire 44 of the power cable is shown soldered to the pin. The cable 40 shown coiled around the base of the drum is for the purpose of supplying power for the drum drive motor and for the fan motor.

Figures 3, 6:
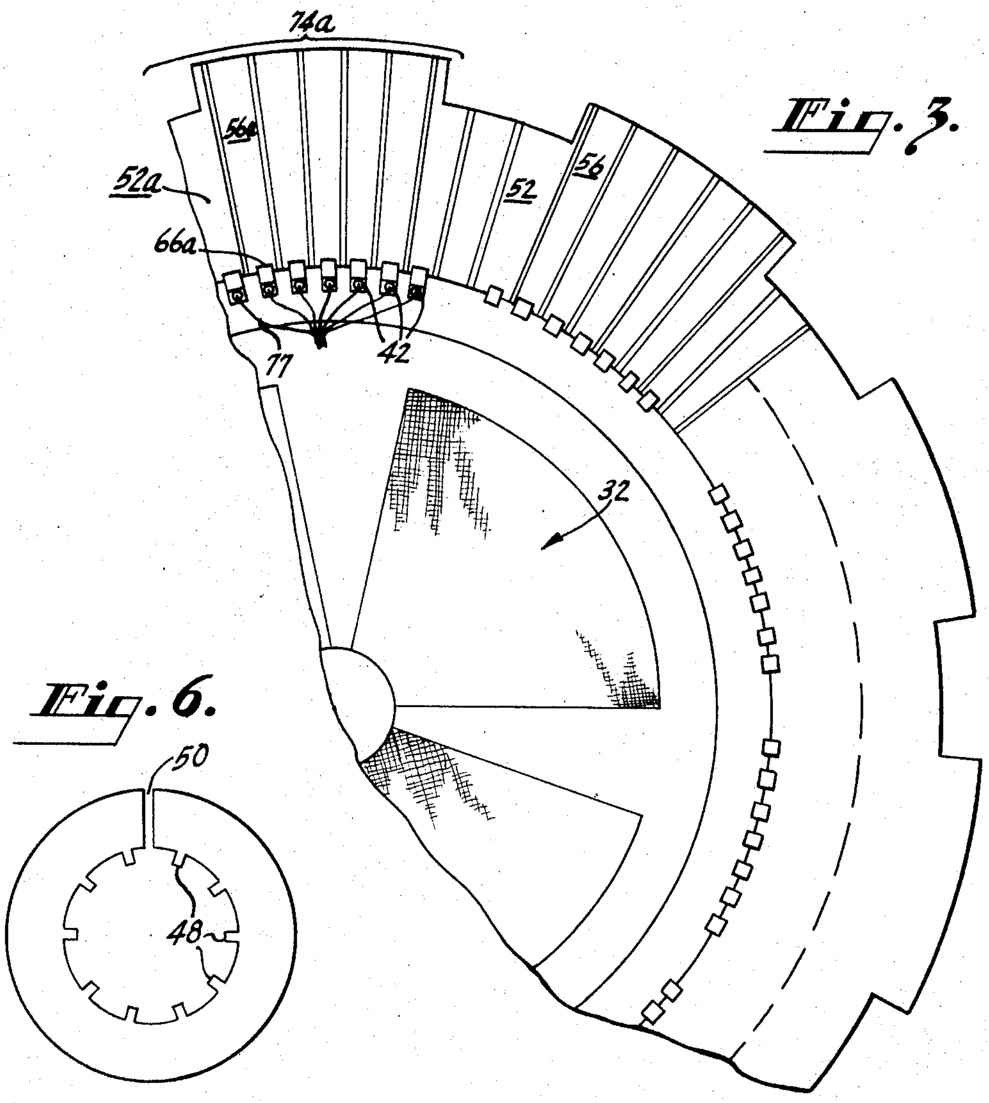
FIGURE 3 is a plan view of a portion of the top of the structure of FIGURE 1.
FIGURE 6 is a plan view of one of the conductor rings of the laminated structure of FIGURES 4 and 5.

FIGURES 3, 4, 5 and 6 should now be referred to. They show some of the details of the structure 37 located at the top of the housing. This structure includes a printed circuit board 46 and a laminated structure located between the printed circuit board and the remainder of the drum housing. Both the printed circuit board and laminated structure are of annular shape and their central openings align with the opening at the top of the housing so that the flow of cooling air is not impeded. The laminated structure is made up of eleven conductor rings formed of a metal, such as copper, and they are spaced from one another by insulator rings. Each metal ring has a thickness of approximately 0.010 inch and each insulator ring has a thickness of 0.0025 inch. The successive metal rings are identical and each is formed with ten equally spaced tabs 48 extending from its inner edge as shown in FIGURE 6. Each metal ring is also formed with a radial slot 50 in the purpose of which is to prevent circulating currents from becoming established in the ring.

Figures 4, 5:
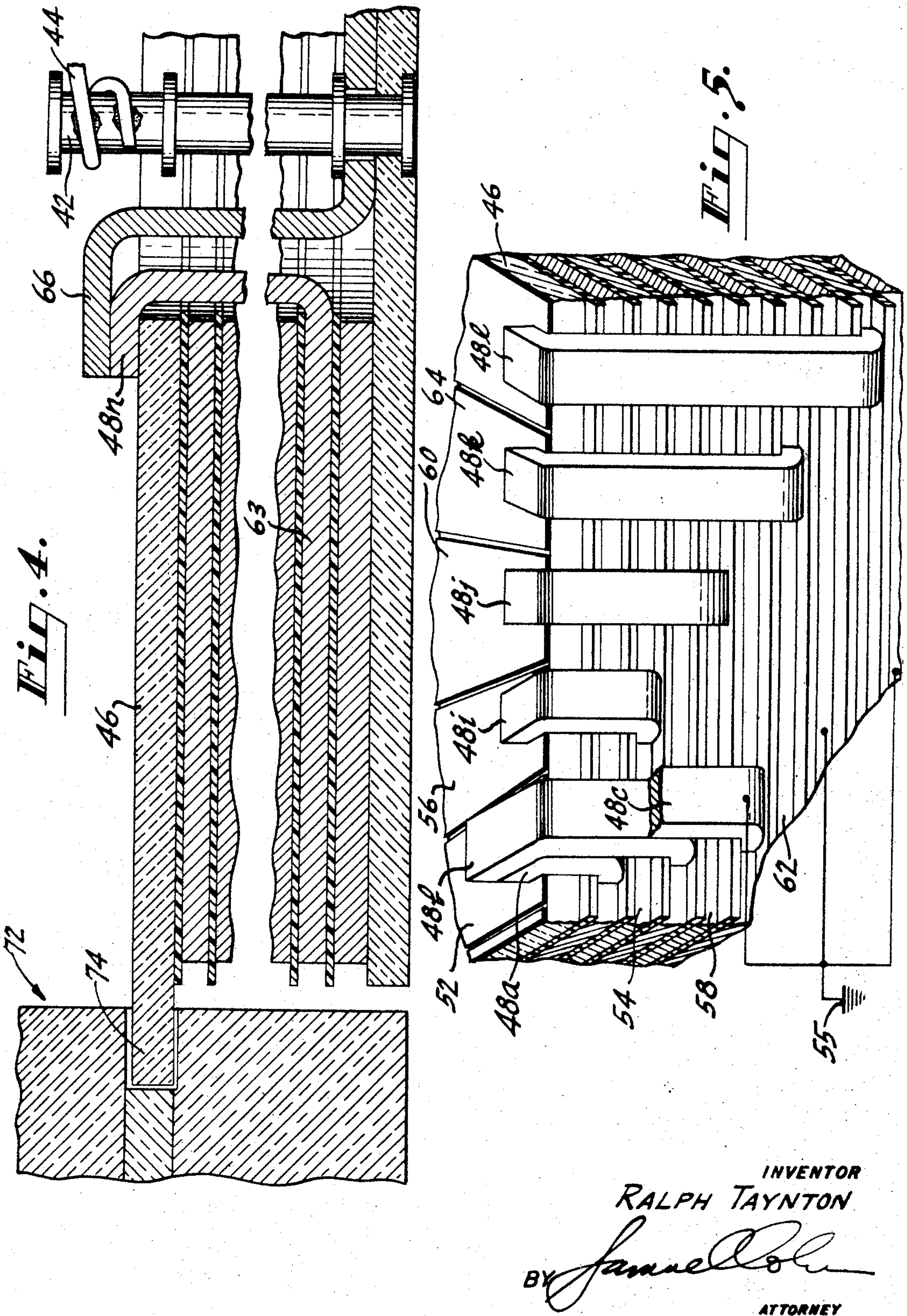
FIGURE 4 is a cross section through a portion of the laminated structure and printed circuit board of the system of FIGURE 1.
FIGURE 5 is a perspective, broken-away view of the inner surface of the laminated structure and printed circuit board of FIGURES 3 and 4.

FIGURE 5 shows how the successive rings are connected to the printed circuit board 46. The tabs 48*a*, 48*b*, 48*c* and so on for alternate ones of the conductors are aligned with one another and then folded over, as shown, so that they make electrical contact with one another and so that the lowermost tab 48*a* makes electrical contact with the radially extending printed conductor 52 on the upper surface of the printed circuit board. (Here and elsewhere soldering or welding may be employed to insure good electrical and mechanical connection.) As indicated by the ground symbol 55, these alternate conductors are connected to ground. The ground connection may be via one of the conductors of the power cable. The tabs for the remaining rings such as 48*i*, 48*j*, 48*k* and so on are staggered relative to one another as shown in FIGURE 5. These rings too are bent up to make contact with other radially extending printed conductors on the circuit board 46. For example, tab 48*i* connects the second conductor ring 54 to radial printed conductor 56; tab 48*j* connects the fourth ring 58 to printed conductor 60; tab 48*k* connects the sixth ring 62 to the printed conductor 64 and so on.

FIGURE 4 illustrates how power enters the ring structure. It is conducted via the power cable wire 44, for example, to the pin 42 and from the pin by means of the Z-shaped conductor 66 to a tab such as 48*n*. From the tab 48*n* power passes to the conductor ring 63 and, as will be shown shortly, ring 63 acts as the central source for whatever voltage it may be carrying, for the various circuits in the system which require this voltage.

Figure 7A:
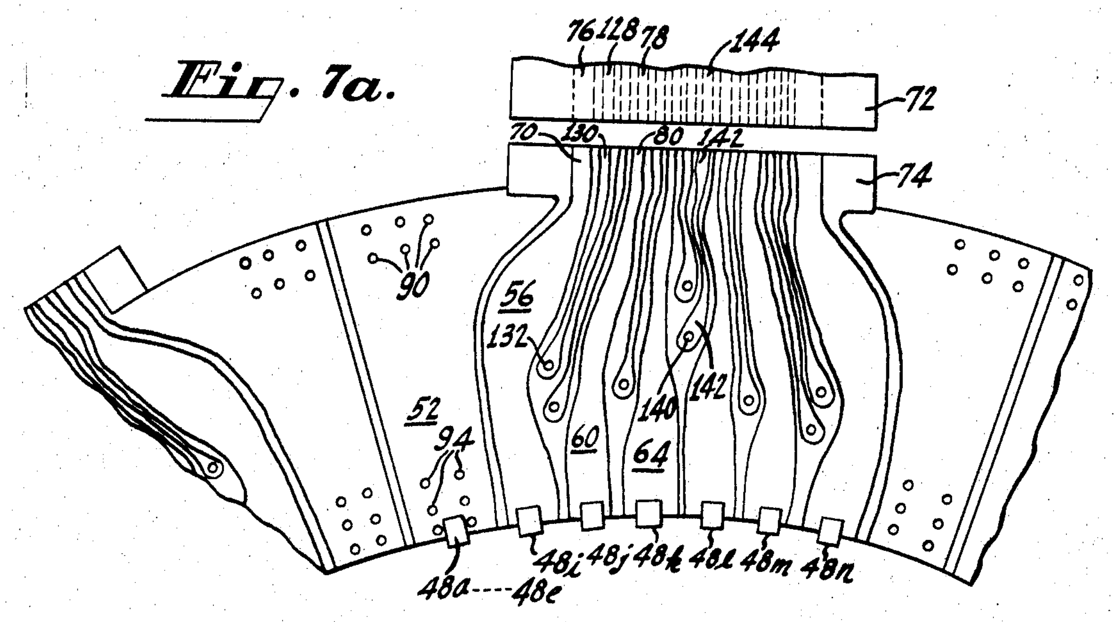
FIGURES 7*a* and 7*b* are plan views of the upper and lower surfaces, respectively, of the printed circuit board of FIGURE 3.
Figure 7B:
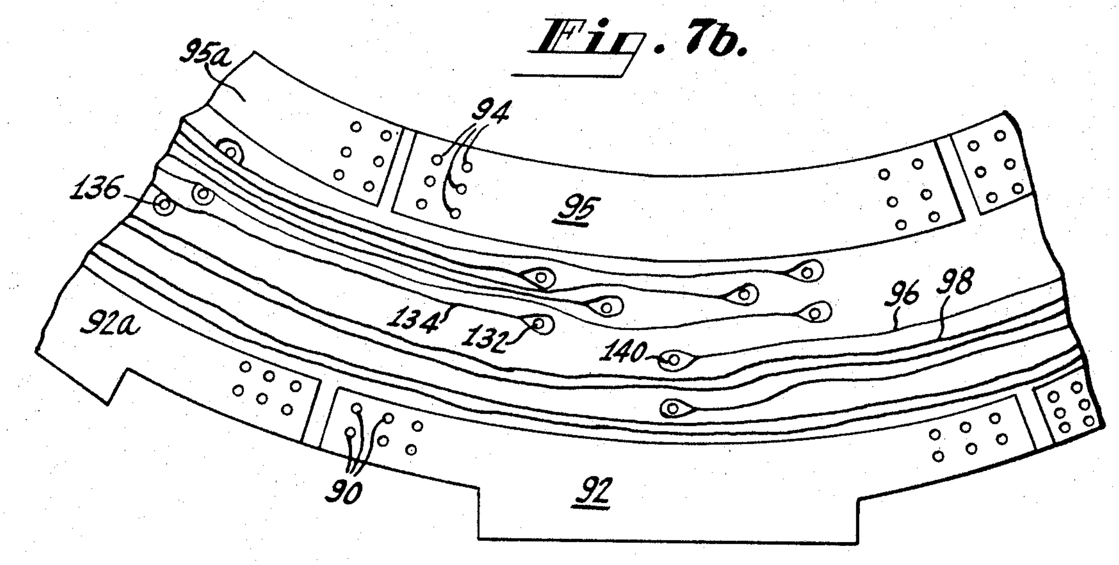

A more detailed showing of the printed circuit board appears in FIGURES 7*a* and 7*b*. A tab such as 48*i* is shown in electrical contact with the radially extending printed conductor 56 on the upper surface of the board. This conductor terminates at 70. This region acts as the male portion of a multiple terminal socket. The female portion, shown at 72, is formed with a central opening (visible in FIGURE 4) which fits over the extension 74 of the circuit board. Lining this opening are a plurality of spaced terminals (conductors) shown by the dashed line in FIGURE 7*a*. These spaced terminals mate with the corresponding radially extending conductors of the printed circuit board when the socket 72 is in place. For example, the terminals 76, shown in phantom view, mates with the portion 70 of the conductor 56. The terminal 78 mates with the portion 80 of the radial conductor 60 of the printed circuit board, and so on.

In operation, the seven wires of the power cable carry the respective direct voltages, +50 volts, +30 volts, +10 volts, +5 volts, ground, −5 volts, −30 volts. These wires are connected via the pins 42, shown in FIGURES 1 and 3, to the radial conductors on the upper surface of the printed circuit boards. From these radial conductors, the voltages go two places. First they go to the socket 72 which connects to the extension 74*a* shown in FIGURE 3. Second, the voltages are applied, via the bent up tabs such as 48*n* of FIGURE 4, to the various conductor rings of the laminated structure. From the conductor rings, these voltages are applied via the other tabs 48 to other radial conductors on the upper surface of the printed circuit board. For example, the ground voltage present on wire 77 and printed conductor 52*a* (FIGURE 3) may be applied via tabs corresponding to 48*a*, 48*b*, 48*c* and so on (FIGURE 5) to alternate rings of the laminated structure. From these rings ground is connected through other tabs 48*a*, 48*b*, and so on to the conductor 52 of FIGURE 3 and to the other radial conductors corresponding to 52 (there are a total of ten) substantially equally spaced around the upper surface of the printed circuit board. Similarly, the voltage present at printed circuit conductor 56*a* of FIGURE 3 is applied via the tab 48*i* (not visible in FIGURE 3 but beneath the Z-shaped element 66*a*) to the ring 54 shown in FIGURE 5 and via the nine other tabs 48*i* such as shown in FIGURE 5, to the nine other printed circuit radial conductors corresponding to 56 on the upper surface of the printed circuit board.

Returning now to FIGURES 7*a* and 7*b*, a conductor such as 52, which is connected to ground, is connected via conductors lining the inner walls of apertures 90 (known as "plated through holes") to a conductor 92 on the underside of the printed circuit board. The printed radial conductor 52 is also connected via the plated through holes 94 to a second conductor 95 on the underside of the printed circuit board. The grounded conductors 92 and 95 and the corresponding conductors 92*a*, 95*a* and so on serve as shields for the peripheral lines such as 96 and 98 and so on on the underside of the printed circuit board. As will be explained shortly, these peripheral lines carry electrical signals.

The printed circuits 92 serve an additional purpose namely that of a connection point for the ground terminal (not visible) of the female sockets such as 72 in FIGURE 7*a*. There is a terminal in the socket 72 which engages the extension of the printed conductor 92 on the underside of the printed circuit board. This terminal is soldered to a wire in the cable, which wire serves as a source of ground potential for the various circuits to which it connects.

Figure 8:
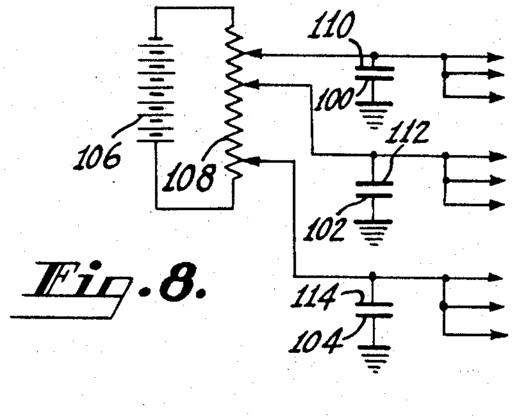
FIGURE 8 is a schematic circuit diagram to help explain the electrical characteristics of the laminated structure power distribution arrangement of the present invention.

Before leaving the subject of power distribution, a brief discussion is in order of the electrical characteristics of the laminated structure power bus. Alternate conductors of this bus are maintained at ground potential as should be clear from FIGURE 5. These conductors are of relataively large area and accordingly, act as capacitor plates connected to ground as shown, for example, at 100, 102, 104 of FIGURE 8. The remaining conductors of the laminated structure bus carry different values of direct voltage as implied by the battery 106 and voltage divider 108 (which together represent a power supply). These buses therefore act also as capacitor plates such as shown at 110, 112 and 114. The laminated structure therefore acts as a high-capacitance, low-inductance filter for the direct voltages it receives from the power source. Such a filter integrates, that is, smooths any voltage surges which occur in the supply voltages. Such surges act to charge the capacitors, which accumulate and store the surge energy and then gradually release it to the circuits they supply.

The various electrical signals developed in the system pass from the various circuits through certain of the wires of cables such as 120, 122 and so on of FIGURE 1 to the sockets, such as 72 and 126, to the printed circuit board. The socket 72 is shown in greater detail in FIGURE 7*a*. A signal may arrive via a terminal 128, shown in phantom view, and be applied to a radially extending printed circuit conductor 130 on the upper surface of the printed circuit board. From this conductor, the signal passes via the plated through hole 132 to the underside of the printed circuit board as shown in FIGURE 7*b*. The signal then passes to a peripherally extending conductor, such as 134, and from this conductor 134 through other plated through holes such as 136, to other radial conductors on the upper surface of the printed circuit board. From these other conductors the signal goes out to sockets and then from these sockets via cables, such as 120, to other circuits. For example, a signal coming from one socket and passing to the peripheral conductor 96 may pass via plated through hole 140 to the conductor 142 on the upper surface of the printed circuit board. From the conductor 142 the signal will pass to the conductor 144 of socket 72 and thence through a wire of a cable to another circuit.

What is claimed is:

1. The combination of:

a housing formed with an opening at one end thereof through which air is adapted to flow and including electrical circuits;

a printed circuit board over said one end of said housing formed also with an opening in general alignment with that in said housing and having spaced conductors on the surface thereof facing away from said housing;

a laminated structure secured between said printed circuit board and said housing of the same general shape as and in general alignment with the printed circuit board, said laminated structure comprising conductor layers separated from one another by insulator layers, the conductor layers being formed with tabs at an edge thereof which extend to and make electrical contact with respective ones of said spaced conductors on said printed circuit board;

a power cable, the conductors of which are connected to some of said spaced conductors; and distribution conductors connecting the conductors of said printed circuit boards to said electrical circuits.

2. The combination set forth in claim 1 wherein one of said cable conductors is at ground potential and wherein the terminal to which said one conductor is connected is electrically connected to alternate ones of said conductor layers.

3. The combination set forth in claim 1 wherein some of said circuits comprise printed circuit boards which form the outer walls of said housing and which also define one wall of a longitudinal passage extending through said housing and ending at said opening at one end thereof; and further including a fan forcing cooling air through said passage and opening.

4. The combination set forth in claim 1 wherein each conductor layer of said laminated structure is formed with a slot extending from the edge thereof defining the opening therein to the outer edge thereof.

5. In combination:

a printed circuit board formed with an opening therein and with terminals on the upper surface thereof extending to the edge portion thereof defining said opening;

a laminated structure having a shape similar to that of the printed circuit board and in general alignment with said printed circuit board, said structure includin conductor layers separated from one another by insulator layers, the conductor layers being formed with tabs extending from the inner edge thereof and each such tab being bent over and in electrical contact with a terminal on said printed circuit board; and leads connected to said terminals to some of which voltages may be applied and from others of which voltages may be taken.

6. In combination:

a circularly shaped printed circuit board formed with a central opening therein and with radial printed conductors on the upper surface thereof extending from the inner to the outer edge portion of said circuit board;

a laminated structure of the same general shape as said printed circuit board and in general alignment with said printed circuit board, said structure includin conductor layers separated from one another by insulator layers, the conductor layers being formed with tabs extending from the inner edge thereof and each such tab being bent over and in electrical contact with the inner edge portion of a radial conductor on said printed circuit board; and distribution leads connected to the outer edge portions of at least some of said radial conductors.

7. The combination set forth in claim 6, further including supply leads connected to the inner edge portions of some of said radial conductors.

8. The combination set forth in claim 6 wherein each said conductor layer of said laminated structure is formed with a radial slot extending from the inner to the outer edge thereof.

9. A signal and power distribution arrangement comprising, in combination:

a circularly shaped printed circuit board formed with a central opening therein and with a group of supply current conductors and a group of signal current conductors on one surface thereof, both said signal and supply current conductors extending in the radial direction and said supply current carrying conductors extending from the inner to the outer edge portion of said circuit board, said circuit board also being formed with peripherally extending conductors on the other surface thereof respectively connected through the circuit board to different ones of said signal current conductors on said one surface of said circuit board;

a laminated structure of the same general shape as the printed circuit board and in general alignment with said printed circuit board, said structure being located adjacent to the surface of said printed circuit board carrying said peripheral conductors, said laminated structure including conductor layers separated from one another by insulator layers, the conductor layers being formed with tabs extending from the inner edge thereof and each such tab being bent over and in electrical contact with the inner edge portion of a supply current conductor on said printed circuit board;

supply current input leads connected to the inner edge portions of some of said supply current radial conductors;

supply current distribution leads connected to the outer edge portions of said supply current radial conductors; and signal current leads connected to the outer edge portions of said signal current radial conductors.

10. The combination of:

a magnetic drum storage system including a generally cylindrically shaped housing formed with a circular opening at one end thereof through which air is adapted to flow, a rotatable drum within the housing, and electrical circuits supported by the housing and surrounding the drum employed in the operation of the drum;

a printed circuit board of annular shape located over one end of said structure whose central opening is in general alignment with that in said housing and having radially extending, spaced conductors on the surface thereof facing away from said housing;

a laminated structure of annular shape secured between said printed circuit board and said housing and with its central opening in general alignment with the opening in the printed circuit board, said laminated structure comprising conductor layers separated from one another by insulator layers, the conductor layers being formed with tabs at the inner edge thereof which tabs are bent over and make electrical contact with the inner ends of respective ones of said radially extending conductors on said printed circuit board;

a power cable the conductors of which are connected to the inner ends of some of said radially extending conductors; and power distribution conductors connecting the outer ends of said radially extending conductors to said electrical circuits.

11. The combination set forth in claim 10, further including:

spaced, peripherally extending conductors on the surface of said purinted circuit board adjacent to said laminated structure for carrying signal currents;

radially extending signal conductors on the surface of said printed circuit board facing away from said laminated structure;

connections through the printed circuit board for connecting the peripheral conductors on one side of said printed circuit board to the radially extending signal conductors on the other side of said printed circuit board; and signal distribution conductors connected between the outer ends of said radially extending signal conductors on said printed circuit board to said electrical circuits.

12. The combination set forth in claim 10 wherein the peripheral surface of said housing comprises a plurality of hinged doors and at least some of said hinged doors consisting of circuit boards to which circuit elements are secured, said hinged doors forming one surface of a passageway which joins said opening at said end of said housing; and further including cooling means for forcing air through said passageway and opening.

13. The combination of:

a magnetic drum storage system including a generally cylindrically shaped housing formed with a circular opening at one end thereof through which air is adapted to flow, a rotatable drum within the housing, and electrical circuits supported by the housing and surrounding the drum employed in the operation of the drum;

a printed circuit board of annular shape located over one end of said structure whose central opening is in general alignment with that of said housing and having radially-extending, spaced signal conductors on the surface thereof facing away from the housing and peripherally extending conductors on the other surface of said printed circuit board, and including also connections through said board for connecting said peripheral conductors to said radially extending conductors; and signal distribution conductors connected between the outer ends of said radially extending spaced conductors and said electrical circuits.

14. A printed circuit board comprising, in combination:

an insulating board;

two groups of conductors extending in the same general direction on one surface of the board, the first group extending from one edge to the opposite edge of the board and the second group interleaved with the first group and extending from said one edge of the board but not meeting said opposite edge of the board, whereby connections may be made to said first group of conductors at said opposite edge of said board;

a third group of conductors, this group on the other surface of said board and extending in a direction at an angle to and crossing the first group of conductors;

connections through the board from the third to the second group of conductors; and said board being formed with a plurality of extensions along said one edge at which sub-groups of conductors terminate, each such sub-group consisting of conductors both from said first and second groups of conductors, whereby connections may be made to conductors of said first and second groups at said extensions.

15. A printed circuit board as set forth in claim 14 wherein said board is of circular shape and is formed with a central opening therein, said one edge of said board comprising the outer edge of the board and said opposite edge comprising the inner edge of said board.

16. The combination of the printed circuit board set forth in claim 14 and a plurality of sockets, each socket engaged with a different one of said extensions and each such socket being formed with conductors which align with and make electrical contact with the conductors which terminate at said extensions.

17. An arrangement for protecting and cooling electrical equipment comprising, in combination:

a frame for said equipment;

a plurality of doors hinged to said frame and forming with said frame a structure which is open at opposite ends thereof and which is closed around the periphery thereof, at least some of said doors comprising circuit boards on which circuit elements are mounted;

a central structure within said frame;

passageways through which air may flow located between the doors and the central structure, said passageways leading to the openings at the opposite ends of said structure; and means for forcing air through said passageway and openings for cooling purposes.

18. An arrangement as set forth in claim 17 wherein said central structure comprises a drum and further including a drive motor mechanically coupled to the drum for rotating the same, said drive motor being in the path of said air forced through at least one of said passageways.

19. A high capacitance power bus comprising a laminated structure in which conductor layers are spaced from one another by insulator layers, each of the layers having a central opening therein and having a peripheral edge, and the conductor layers each being formed with a continuous slot which extends from the edge thereof defining said opening to the peripheral edge thereof.

20. A bus as set forth in claim 19 wherein each layer, both insulator and conductor, is of annular shape.

21. A bus as set forth in claim 19, further including means for maintaining alternate ones of said conductor layers at a reference potential.

22. A disk shaped substrate formed with a central opening therein; radially extending spaced conductors over one surface of said substrate; peripherally extending spaced conductors on the other surface of said substrate; and connections passing through said substrate for connecting radially extending conductors to other radially extending conductors through peripherally extending conductors.

23. The combination of the structure set forth in claim 22 with a plurality of plugs which mate with said substrate and each of which includes a group of terminals which engage a group of said radially extending conductors.

24. The combination set forth in claim 22 wherein the innermost and outermost ones of said peripherally extending conductors are of substantially greater width than the remaining peripherally extending conductors; and further including means for maintaining the innermost and outermost ones of said peripherally extending conductors at a reference potential.

References Cited

UNITED STATES PATENTS

| | | | |
|---|---|---|---|
| 3,072,874 | 1/1963 | Roney. | |
| 3,277,346 | 10/1966 | McAdam et al. | 317—100 |

LEWIS H. MYERS, *Primary Examiner.*

J. R. SCOTT, *Assistant Examiner.*

U.S. Cl. X.R.

317—100